United States Patent
Mastrianni et al.

(10) Patent No.: US 7,016,920 B2
(45) Date of Patent: Mar. 21, 2006

(54) METHOD FOR TRACKING RELATIONSHIPS BETWEEN SPECIFIED FILE NAME AND PARTICULAR PROGRAM USED FOR SUBSEQUENT ACCESS IN A DATABASE

(75) Inventors: Steve J. Mastrianni, Unionville, CT (US); Thomas E. Chefalas, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 09/865,243

(22) Filed: May 25, 2001

(65) Prior Publication Data

US 2002/0178436 A1 Nov. 28, 2002

(51) Int. Cl.
*G06F 17/30* (2006.01)
(52) U.S. Cl. .......................... 707/200; 707/1; 717/169
(58) Field of Classification Search .............. 707/1–10, 707/100, 104.1, 200–206, 501.1, 510–513; 709/220–225, 227–230, 263–265, 203–210; 713/185–189, 190–193, 201, 165–168; 717/115–116, 717/121–122, 131, 160–162, 108, 169; 711/150–161; 710/120–128; 715/500.1
See application file for complete search history.

(56) References Cited

U.S. PATENT DOCUMENTS

| | | | | |
|---|---|---|---|---|
| 5,093,779 A | | 3/1992 | Sakurai ...................... 395/600 |
| 5,359,725 A | * | 10/1994 | Garcia et al. ............... 707/200 |
| 5,412,808 A | * | 5/1995 | Bauer ............................. 707/1 |
| 5,423,022 A | * | 6/1995 | Ackley ........................ 703/20 |
| 5,504,852 A | * | 4/1996 | Thompson-Rohrlich .... 715/835 |
| 5,617,568 A | * | 4/1997 | Ault et al. ................... 707/101 |
| 5,649,205 A | | 7/1997 | Martins ...................... 395/712 |
| 5,701,451 A | | 12/1997 | Rogers et al. .............. 395/600 |
| 5,710,918 A | | 1/1998 | Lagarde et al. ............. 395/610 |
| 5,721,908 A | | 2/1998 | Lagarde et al. ............. 395/610 |
| 5,729,735 A | | 3/1998 | Meyering .................... 395/610 |
| 5,745,754 A | | 4/1998 | Lagarde et al. ............. 395/615 |
| 5,758,153 A | * | 5/1998 | Atsatt et al. ............ 707/103 R |
| 5,758,352 A | * | 5/1998 | Reynolds et al. ........... 707/200 |
| 5,819,251 A | * | 10/1998 | Kremer et al. .................. 707/1 |
| 5,822,780 A | * | 10/1998 | Schutzman .................. 711/165 |
| 5,852,747 A | | 12/1998 | Bennett et al. ............. 395/860 |
| 5,873,085 A | * | 2/1999 | Enoki et al. .................. 707/10 |
| 5,897,640 A | * | 4/1999 | Veghte et al. ............... 707/202 |
| 5,948,062 A | * | 9/1999 | Tzelnic et al. .............. 709/219 |

(Continued)

FOREIGN PATENT DOCUMENTS

EP 0566964 B1 8/1997

(Continued)

OTHER PUBLICATIONS

Gene H.Kim et al. The design and implementation of Tripwire : A file system Integrity checker, proceedings of the 2nd ACM conference on compuer and communications security, Aug. 29, 1994, pp 1-18.*

(Continued)

*Primary Examiner*—Srirama Channavajjala
(74) *Attorney, Agent, or Firm*—Duke W. Yee; Louis P. Herzberg; James O. Skarsten

(57) ABSTRACT

A method, apparatus, and computer implemented instructions for tracking relationships between programs and data in a data processing system. A file access request is received from a program, wherein the request is received at an operating system level. An association is stored between the file and the program.

42 Claims, 4 Drawing Sheets

U.S. PATENT DOCUMENTS

| | | | | |
|---|---|---|---|---|
| 5,991,772 | A | 11/1999 | Doherty et al. | 707/202 |
| 6,088,694 | A | 7/2000 | Burns et al. | 707/8 |
| 6,145,044 | A * | 11/2000 | Ogura | 710/311 |
| 6,185,574 | B1 * | 2/2001 | Howard et al. | 707/200 |
| 6,195,650 | B1 * | 2/2001 | Gaither et al. | 707/1 |
| 6,230,185 | B1 | 5/2001 | Salas et al. | 707/204 |
| 6,266,679 | B1 | 7/2001 | Szalwinski et al. | 707/204 |
| 6,279,011 | B1 | 8/2001 | Muhlestein | 707/204 |
| 6,321,219 | B1 * | 11/2001 | Gainer et al. | 707/3 |
| 6,327,703 | B1 * | 12/2001 | O'Donnell et al. | 717/162 |
| 6,330,570 | B1 | 12/2001 | Crighton | 707/204 |
| 6,341,341 | B1 | 1/2002 | Grummon et al. | 711/162 |
| 6,351,741 | B1 * | 2/2002 | Flenniken | 707/2 |
| 6,356,915 | B1 * | 3/2002 | Chtchetkine et al. | 707/200 |
| 6,381,615 | B1 * | 4/2002 | Gaither et al. | 707/200 |
| 6,389,427 | B1 * | 5/2002 | Faulkner | 707/104.1 |
| 6,453,325 | B1 | 9/2002 | Cabrera et al. | 707/204 |
| 6,453,354 | B1 * | 9/2002 | Jiang et al. | 709/229 |
| 6,513,051 | B1 | 1/2003 | Bolosky et al. | 707/204 |
| 6,639,615 | B1 * | 10/2003 | Majumdar et al. | 715/839 |
| 6,654,769 | B1 * | 11/2003 | Ito et al. | 707/200 |
| 6,662,198 | B1 | 12/2003 | Satyanarayanan et al. | 707/204 |
| 6,665,689 | B1 | 12/2003 | Muhlestein | 707/204 |
| 6,671,701 | B1 * | 12/2003 | Chouinard | 707/201 |
| 6,697,846 | B1 * | 2/2004 | Soltis | 709/217 |
| 6,704,736 | B1 | 3/2004 | Rys et al. | 707/100 |
| 6,714,952 | B1 | 3/2004 | Dunham et al. | 707/204 |
| 6,732,124 | B1 | 5/2004 | Koseki et al. | 707/202 |
| 6,735,601 | B1 * | 5/2004 | Subrahmanyam | 707/200 |
| 6,742,035 | B1 * | 5/2004 | Zayas et al. | 709/226 |
| 6,766,352 | B1 | 7/2004 | McBrearty et al. | 709/203 |
| 6,772,177 | B1 | 8/2004 | Hsiao et al. | 707/204 |
| 6,789,115 | B1 | 9/2004 | Singer et al. | 709/224 |
| 6,804,680 | B1 * | 10/2004 | Melli | 707/102 |
| 2001/0025311 | A1 * | 9/2001 | Arai et al. | 709/225 |
| 2002/0103818 | A1 | 8/2002 | Amberden | 707/205 |
| 2002/0111840 | A1 | 8/2002 | Bagdonas et al. | 705/7 |
| 2002/0120634 | A1 | 8/2002 | Min et al. | 707/200 |
| 2002/0169781 | A1 | 11/2002 | Poole et al. | 707/100 |
| 2004/0107199 | A1 | 6/2004 | Dairymple, III et al. | 707/100 |
| 2004/0193953 | A1 | 9/2004 | Callahan et al. | 714/15 |
| 2004/0236916 | A1 | 11/2004 | Berkowitz et al. | 711/162 |
| 2005/0021566 | A1 | 1/2005 | Mu | 707/200 |
| 2005/0076005 | A1 * | 4/2005 | Chefalas et al. | 707/2 |

FOREIGN PATENT DOCUMENTS

| | | | | |
|---|---|---|---|---|
| EP | 0851347 | A2 * | 7/1998 | |
| EP | 1093055 | A2 * | 4/2001 | |
| EP | 1455276 | * | 9/2004 | 11/14 |
| EP | 1484680 | A1 | 12/2004 | |
| GB | 2378015 | A * | 1/2003 | |
| WO | WO 99/66401 | | 12/1999 | |
| WO | WO 00/19337 | | 4/2000 | |
| WO | WO 00/72200 | A1 * | 11/2000 | |
| WO | WO 01/77908 | A2 * | 10/2001 | |

OTHER PUBLICATIONS

Jim Christensen et al. "Accessing remote filesystems as autonomous information surces", published: Mar. 2000. 4 pages.*

Hui Lei et al. "an analytical approach to file prefectching",USENIX annual technical conference, 1997, 14 pages.*

Mutka,M.W et al. "managing personal files across independent file management units", distributed computing systems, proceeding third workshop on future trends Apr. 1, 992, pp 254-261.*

Albert D.Alexandrov et al. "Ufo: A personal global file system based on user-level extensions to the operating system", ACM transactions on computer systems, vol 16, No. 3, Aug. 1998, pp 207-233.*

Donald Golden et al. "the structure of microcomputer file systems", Communications of the ACM vol 29, No. 3, Mar. 1986, pp222-230.*

Mark R Brown, et al. "The Alpine file system", ACM transactions on computer systems, vol 3, No. 4, No. 1985, pp. 261-293.*

EMC Data Manager, EDM Symmetri connect, A description of EDM Symmetrix Connect Backup published on Nov. 1998, pp. 1-9.

EMC2 White Paper, "Backup Solutions for the Celerra File Server", printed May 15, 2001, pp. 1-8.

Chervenak et al., "Protecting File Systems: A Survey of Backup Techniques (1998)", CiteSeer, pp. 1-15.

* cited by examiner

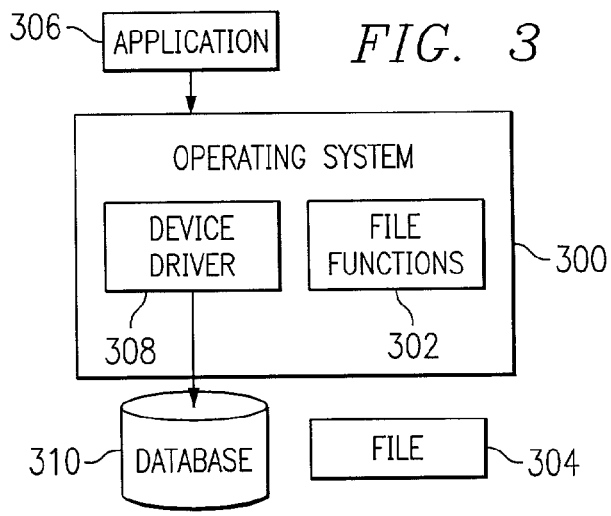
FIG. 3
FIG. 4
```
   406      408       410            412              414        416
02062001|170001|mytext.doc|c:\My Documents|word.exe|stevemas| ~400
02062001|180722|mytextcopy.doc|c:\My Documents|word.exe|stevemas ~402
02102001|085531|newtext.sav|c:\My Documents|word.exe|stevemas ~404
```
FIG. 5
GetFileList (szAppName, char*criteria);
500
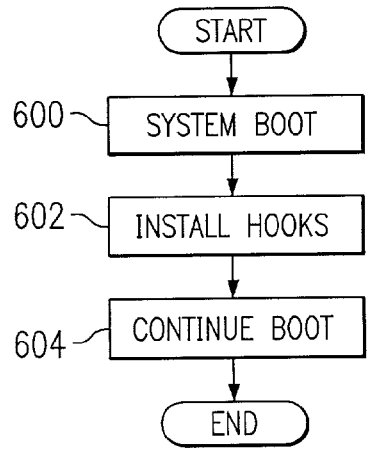
FIG. 6

METHOD FOR TRACKING RELATIONSHIPS BETWEEN SPECIFIED FILE NAME AND PARTICULAR PROGRAM USED FOR SUBSEQUENT ACCESS IN A DATABASE

CROSS REFERENCE TO RELATED APPLICATIONS

The present invention is related to Method and Apparatus for the Automatic Migration of Applications and Their Associated Data and Configuration Files, Ser. no. 09/865,249 is now pending, and Method and Apparatus for Performing the Identification of Files to be Backed Up Using Relational Meta Data, Ser. No. 09/866,251 is now pending, filed even date hereof, assigned to the same assignee, and incorporated herein by reference.

BACKGROUND OF THE INVENTION

1. Technical Field

The present invention relates generally to an improved data processing system, and in particular to a method and apparatus for managing information about applications and files. Still more particularly, the present invention provides a method, apparatus, and computer implemented instructions for performing automatic discovery of relationships between applications and associated data for those applications.

2. Description of Related Art

When an application is installed on a computer system, the setup program, which is part of the application and supplied by the application supplier, registers with the operating system that the application will be creating data files of a certain file type on the file system. More specifically, the setup program tells the operating system the type of data files that will be created, edited, deleted, or otherwise manipulated by the application. Data files manipulated by the application are associated with that application as long as that application remains installed on the computer system, providing the file type is not changed. If the application is removed, the mapping of the file extension to the application is lost. The current state of the art is to identify the data file type with a three letter filename extension. For example, the setup program for Microsoft Word registers with the operating system to indicate that filenames with the extension ".doc" are associated with Microsoft Word. Microsoft Word is a word processing program available from Microsoft Corporation. As a result, when a user selects a data file to be opened, the operating system uses the filename extension of that data file to determine which application should be launched.

Users typically install dozens of applications on a data processing system, such as editors, e-mail programs, Internet browsers, and business applications such as payroll or inventory access. Each of these applications usually create, edit, rename, or delete data files of a certain data type as determined by the file type extension. These data files may include user identification such as users Ids and passwords, application configuration files, reports, and data files. Currently, each application consistently creates data file types associated with an application vendor determined filename extension. For example, Microsoft Word creates document data files using the filename extension ".doc", and Lotus WordPro creates document data files using the filename extension ".lwp", Lotus Notes creates data files using the filename extension ".id" for userid information and ".nsf" for notes databases. Lotus Word Pro and Lotus Notes are available from Lotus Development Corporation. Each application vendor selects a unique filename extension to be used for their application and hopes that no other application vendor selects the same extension. In the case of some programs that use common types of files such as .mid or .jpg, installing another program will often incorrectly associate the data files with the newly installed application.

As the end user executes applications and works on data files, the list of data files associated with the application continually changes. Some data files may be created, others deleted or edited, and some renamed to other filenames or file type extensions. The user also may place some of these files in other places within the file system. With these types of file manipulations, the files may become hard to locate without using a tool to search the hard disk drive for filenames with a well known filename extension for a particular application. The files also may contain extensions that do not follow the recommended file naming convention. For example, the user may create a Microsoft Word document and save it with the filename extension of ".zoo" instead of the standard .doc extension.

Therefore, it would be advantageous to have an improved method and apparatus for tracking data and configuration files associated with these applications.

SUMMARY OF THE INVENTION

The present invention provides for a method, apparatus, and computer implemented instructions for tracking relationships between programs and data in a data processing system. A file access request is received from a program, wherein the request is received at an operating system level. An association between the application and data and configuration files is created and stored in a database that can be subsequently accessed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components involved in automatic discovery of relationships between application programs and associated data in accordance with a preferred embodiment of the present invention;

FIG. 4 is a diagram of meta data describing relationships between applications and associated data in accordance with a preferred embodiment of the present invention;

FIG. 5 is a diagram illustrating an example call in accordance with a preferred embodiment of the present invention;

FIG. 6 is a flowchart of a process used for installing the processes for automatically discovering relationships between applications and associated data in accordance with a preferred embodiment of the present invention;

DETAILED DESCRIPTION OF THE PREFERRED EMBODIMENT

Figure 1:
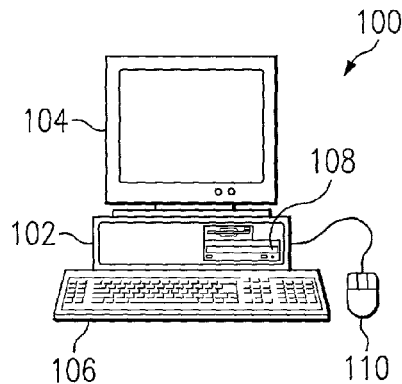
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
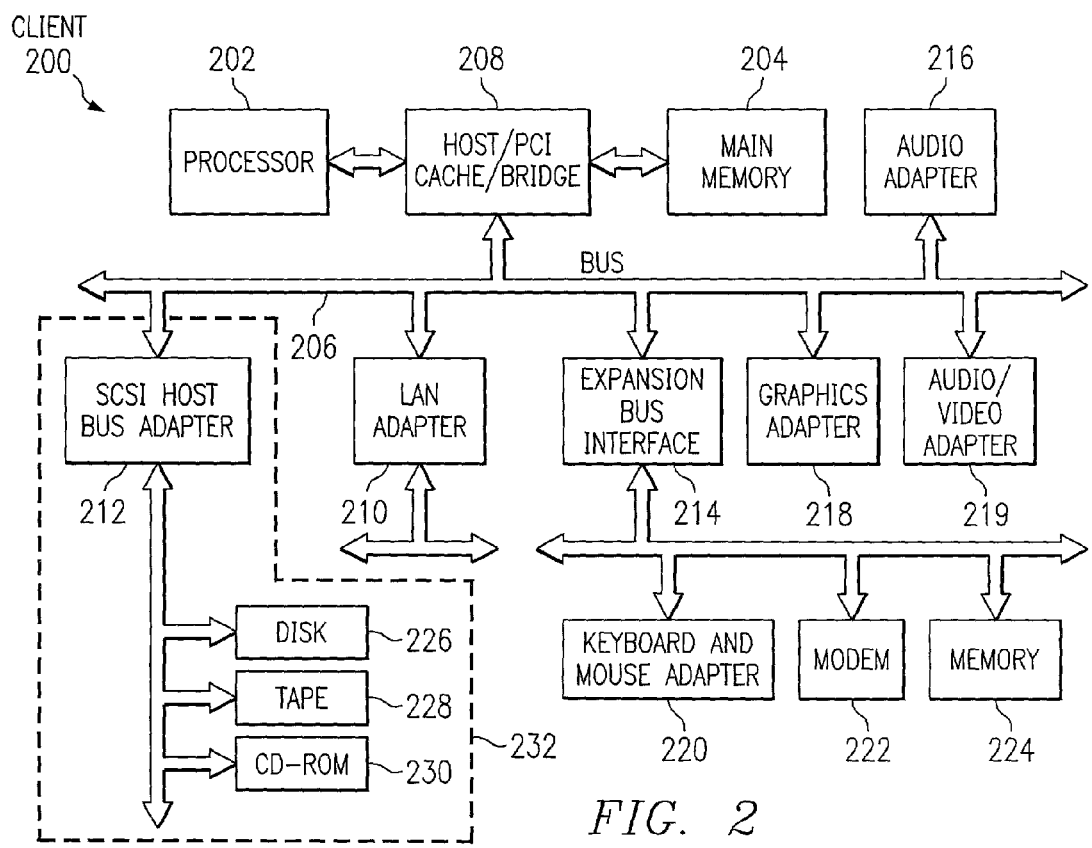
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide nonvolatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer implemented instructions for performing the automatic discovery of the relationships between application programs and their associated data and configuration files. In the depicted example, the mechanism of the present invention includes a software program and software device driver mechanism that is installed on the computer system at the time the operating system is installed. These components may be installed at a later time, but the discovery of the relational meta data only begins when components of the present invention have been installed. The software program "hooks" or connects to the operating system at the single point where all file-oriented requests are handled. The single point of entry for various classes of operating system services is a standard feature of all currently available operating systems. When any executing program (application, service, etc.) makes a request to open, close, delete, rename, or move a file, the request is detected, and the name of the requesting program is identified The file being operated on and the name of the program accessing the file is used to automatically create a relationship between the two. This relationship, file and program, is captured and represented in a relational meta data format. Additional meta data about the file creation can also be captured, such as the location of the file, time, date, or identity of the user. This relational meta data can be stored in another data file in the file system or saved in a database (i.e. registry, database, directory, etc.). The database can be protected and hidden from users to prevent the deletion or corruption of the data.

With reference now to FIG. 3, a diagram illustrating components involved in automatic discovery of relationships between application programs and associated data is depicted in accordance with a preferred embodiment of the present invention. The components illustrated in FIG. 3 may be implemented as software and data structures in a data processing system, such as data processing system 200 in FIG. 2.

In the depicted examples, operating system 300 includes file functions 302. These files functions are used to perform different functions on files, such as file 304 in response to requests from applications, such as application 306. These functions include, for example, opening, closing, creating, copying, renaming, and deleting files. When the user starts application 306, application 306 generally requires a data file to act upon. For instance, starting a word processor usually requires that the user indicate the name of the file to be created, edited or processed. Most applications have some type of open menu where the user specifies which file they are going to work on. The user generally clicks a "file open" button or menu item to open a file, and is then presented with a list of files meeting that criteria to work on.

Using current technology, the list of files available to work on is determined the file type, which may be identified through the file type extension. When an application is installed, it usually notifies the operating system, which file type extension should be associated with that program. For example, Microsoft Word notifies the operating system that it will use files with the .doc extension. After the application is installed, if the user selects a file with the .doc extension, the Microsoft Word application will be launched to operate on that file. Using current technology, the association between the application program and the file type extension exists until that application program is removed from the system. When the application is removed, the removal program also removes any associations that had been established at the time the application was installed.

With the mechanism of the present invention, calls by application 306 to file functions 302 are hooked or routed to device driver 308. These functions calls include opening, closing, creating, copying, renaming, and deleting a file. Each time a call for one of the file functions is made, the call is intercepted by device driver 308. The name of the program making the call is identified by device driver/service 308 along with the name of the data file being operated on.

For example, device driver 308 hooks the single entry point of the "file close" function. Each time a file, such as file 304, is closed, the close is intercepted by device driver 308. This device driver identifies the name of application 304 closing file 304, along with the name of file 304. In this example, file 304 is opened and closed by application 306, representing a normal close of file 304. The relational meta data that represents the association of file 304 to application 306 is updated in database 310 with the new information. If application 306 opens file 304, but another software entity, such as operating system 300 closes file 304, then an abnormal close may have occurred because of a failure in application 306.

Each time a file is opened or closed, the relational meta data for the given file is updated by device driver 308. The mechanism of the present invention also may hook the operating system entry points for file erase, file rename, file move, and file copy functions at the device driver level or at the operating system service level. These additional hooks also update the relational meta data in database 310. If an application program, in the process of executing, creates a file, the file creation information and association to the application program is stored in relational meta data. If the application program deletes a file, the relational meta data for the deleted file is deleted. The relational meta data for file 304 is updated in database 310 and is updated if the application renames file 304. It is important to note that, in these examples, in the event that the same file is accessed by more than one program, the database will contain the reference to the application that accessed the file most recently.

If the user copies file 304 to another location, the relational meta data for file 304 is updated with the new location. If multiple applications perform activity against file 304, the relational meta data for file 304 is updated to reflect the association to multiple applications.

When the application 306 is started, the user is presented with a list of files to work on, depending on the file type extension registered with the operating system by application 306. The user selects one or more files to work on, and then confirms the choice by clicking an OK button or similar type of control. Some application programs, such as Microsoft Word, keep a finite length list of the files acted upon in persistent storage. One of the options the user has is to select the history list of files that have been accessed by the application program. The mechanism of the present invention provides a method, apparatus, and computer implemented instructions for a convenient way to provide quick access to frequently manipulated files.

The list of files displayed that can be acted upon is based on the file type extension. However, the user may have renamed the file with a different extension, or moved the file to another area on the disk or even another computer or network share. Application 304 has no direct knowledge of these files, their new extension, or their new location because the file type extension has changed or the files have been moved to an unknown location. Because this information is in database 301, application 304 can query database 310 through calls to device driver 308 to find the file names and location of all of the data and configuration files associated with the application 304. Application 304 then uses the list of files from database 310 to present to the user at the time application 304 is run. Instead of choosing a data file of a certain file type extension and from a specified physical location on the disk, the user can now select any file that had been created by application 304 and from any location on the disk. The access to database 310 may be provide through standard application programming interface (API) calls made to device driver 308 from application 304 or another application. Using the access methods provided by the invention the user can query the relational database with such queries as:

Show me the files created between Dec. 1, 2000 and Dec. 15, 2000.

Show me the files created since Jan. 1, 2001 by the user stevemas.

Show me all of the files associated to the Lotus 1-2-3 program.

The association of applications with files and file locations may extend to files created, stored, or moved on remote storage devices located on another computer system. The mechanism of the present invention may be installed as an integral part of operating system 300, such as within a kernel. Alternatively, the mechanism may be added as a patch or add-on component if added to operating system 300 after its installation.

Turning next to FIG. 4, a diagram of meta data describing relationships between applications and associated data is depicted in accordance with a preferred embodiment of the present invention. In the depicted example, records 400, 402, and 404 are examples of meta data, which may be stored in a database, such as database 310 in FIG. 3. Record 400 includes sections 406, 408, 410, 412, 414, and 416. Section 406 identifies the date of the last file update. Section 408 indicates the last time the file was access in hours, minutes, and seconds. Section 410 identifies the name of the file, while section 412 identifies the location of the file. The application making the call for the function is identified in section 414. The user is identified in section 416.

With reference now to FIG. 5, a diagram illustrating an example call is depicted in accordance with a preferred embodiment of the present invention. Call 500 is an example of a call, which may be used to obtain a file list. The call specifies an application name as well as criteria, which may be used to search for records, such as records 400, 402, and 404 in FIG. 4 within database 310 in FIG. 3. The criteria may be, for example, a list of files associated with the Lotus Word Pro application that are more than 30 days old.

Turning next to FIG. 6, a flowchart of a process used for installing the processes for automatically discovering relationships between applications and associated data is depicted in accordance with a preferred embodiment of the present invention. The process begins by detecting a system boot of the data processing system (step 600). Next, hooks are installed (step 602). The hooks installed are those for use by a device driver, such as device driver 308 in FIG. 3 to hook or intercept calls for file functions. Then, the system boot is continued (step 604) with the process terminating thereafter.

Figure 7:
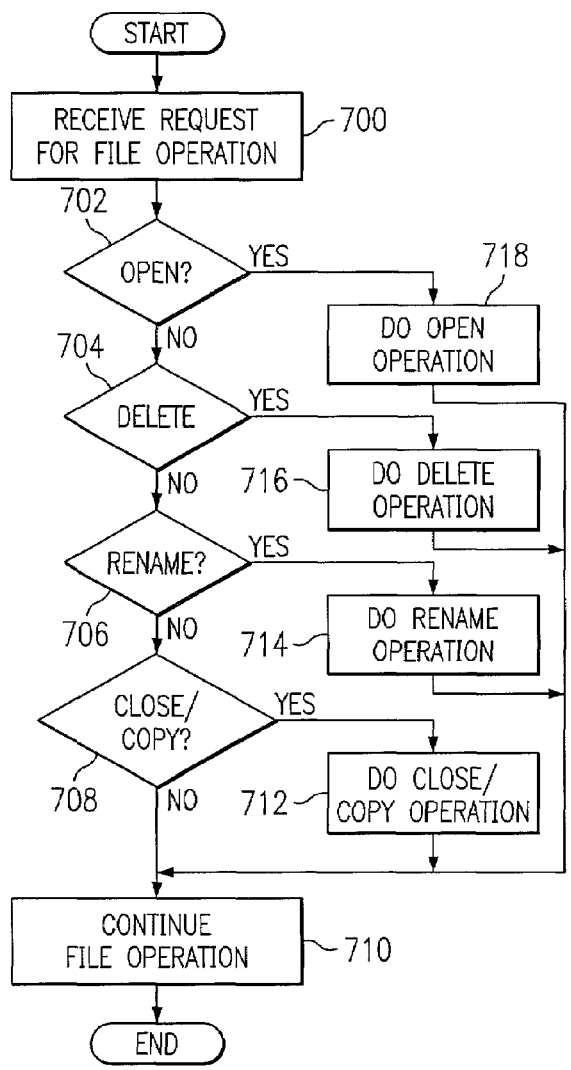
FIG. 7 is a flowchart of a process used for handling requests for file operations in accordance with a preferred embodiment of the present invention.

The flowcharts illustrated in FIGS. 7–11 are examples of processes used to automatically discover relationships between applications and associated data. With reference now to FIG. 7, a flowchart of a process used for handling requests for file operations is depicted in accordance with a preferred embodiment of the present invention. The process illustrated in FIG. 7 may be implemented in a device driver, such as device driver 308 in FIG. 3.

The process begins by receiving a request for a file operation (step 700). Next, a determination is made as to whether the file operation is to open a file (step 702). If the file operation is not open, then a determination is made as to whether the file is to be deleted (step 704). If the file is not to be deleted, a determination is made as to whether the file is to be renamed (step 706).

If the file is not to be renamed, a determination is made as to whether the file is closed or copied (step 708). If the file is not to be closed or copied, file operation continues (step 710) with the process terminating thereafter. At this point, the file operation request is passed to the actual file function that is to process the request.

With reference again to step 708, if the file is to be closed or copied, close or copy operation is performed (step 712) with the process proceeding to step 710. Turning back to step 706, if the file is to be renamed, a rename operation is performed (step 714) with the process proceeding to step 710 thereafter. With reference again to step 704, if the file is to be deleted, a delete operation is performed (step 716) and the process proceeds to step 710 as described above. With reference again to step 702, if the file is opened, an open operation is performed (step 718) with the process proceeding to step 710.

Figure 8:
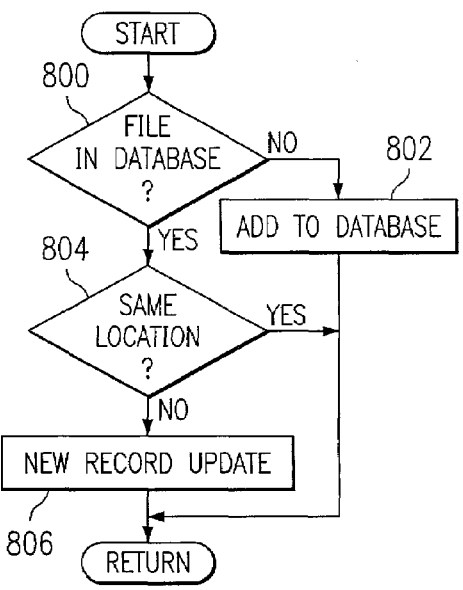
FIG. 8 is a flowchart of a process used for processing an open operation in accordance with a preferred embodiment of the present invention.

Turning next to FIG. 8, a flowchart of a process used for processing an open operation is depicted in accordance with a preferred embodiment of the present invention. The process illustrated in FIG. 8 is a more detailed description of step 718 in FIG. 7.

This process is called in response to an open operation being present. The process begins with a determination as to whether a record of the file identified for the operation is present in the database (step 800). If the file is not present in the database, an identification of the file is added to the database (step 802) with the process returning thereafter for a continuation of the file operation. The identification may include, for example, the name of the file, the name of application requesting the operation, a date, and a time of the request.

Otherwise, a determination is made as to whether the file is found in the same location (step 804). If the file is found at the same location, the process returns to continue process the file operation. If the file is not in the same location, the record is updated with the new location (step 806) with the process then returning to continue processing of the file operation. The open operation occurs immediately because the database cannot be updated until it is known that the file can be opened.

Figure 9:
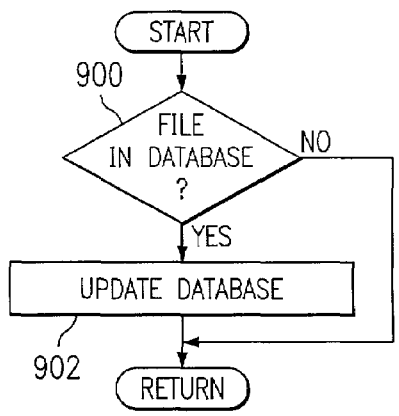
FIG. 9 is a flowchart of a process used for processing a delete operation in accordance with a preferred embodiment of the present invention.

With reference now to FIG. 9, a flowchart of a process used for processing a delete operation is depicted in accordance with a preferred embodiment of the present invention. The process illustrated in FIG. 9 is a more detailed description of step 716 in FIG. 7.

The process begins with a determination as to whether a record of the file is in a database (step 900). If the file is in the database, the database is updated (step 902) with the process then returning to continue the file operation. This update reflects the application closing the file as well as other information, such as a time and date of the operation. Otherwise, the process returns without performing any action in the database. In this instance, the file is not tracked by the mechanism of the present invention.

Figure 10:
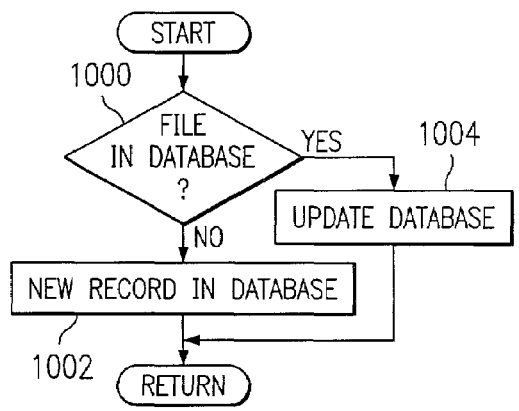
FIG. 10 is a flowchart of a process used for renaming in accordance with a preferred embodiment of the present invention.

Turning next to FIG. 10, a flowchart of a process used for renaming is depicted in accordance with a preferred embodiment of the present invention. The process illustrated in FIG. 10 is a more detailed description of step 714 in FIG. 7.

The process begins with a determination as to whether a record of the file is in the database (step 1000). If the file is not in the database, a new record is established in the database (step 1002), and the process returns to continue processing the file operation. The new record may be in a format, such as, for example, record 400 in FIG. 4. Otherwise, the database is updated (step 1004) with the process returning for continued processing of the file operation.

Figure 11:
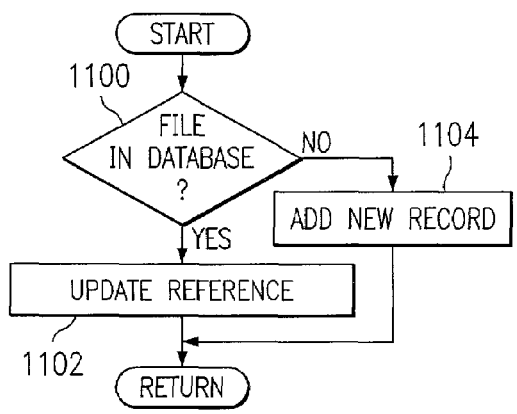
FIG. 11 is a flowchart of a process used for processing a close or copy operation in accordance with a preferred embodiment of the present invention.

With reference now to FIG. 11, a flowchart of a process used for processing a close or copy operation is depicted in accordance with a preferred embodiment of the present invention. The process illustrated in FIG. 11 is a more detailed description of step 712 in FIG. 7.

The process begins with a determination as to whether a record of the file is in a database (step 1100). If the file is in the database, a reference is updated (step 1102) with the process returning to continue the file operation. Otherwise, a new record for the file is added to the database (step 1104), and the process returns for continuation of the file operation.

Figure 12:
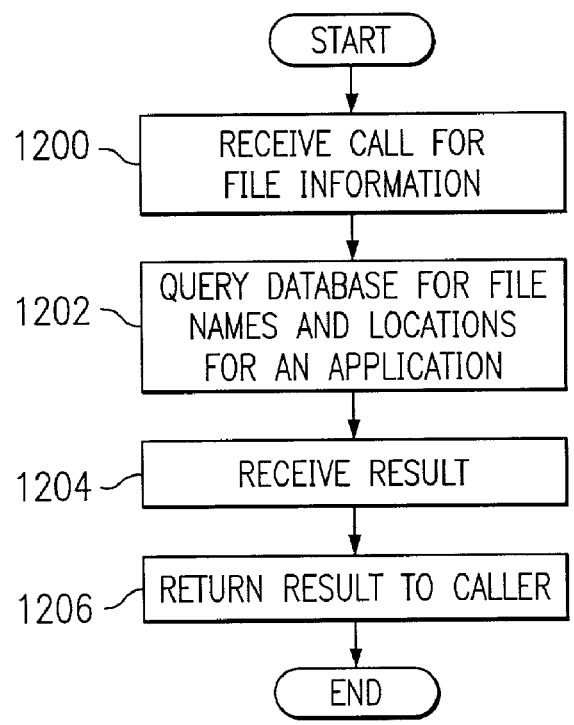
FIG. 12 is a flowchart of a process used for processing queries for file information in accordance with a preferred embodiment of the present invention.

Turning next to FIG. 12, a flowchart of a process used for processing queries for file information is depicted in accordance with a preferred embodiment of the present invention. The process illustrated in FIG. 12 may be implemented in a device driver, such as device driver 308 in FIG. 3.

The process begins by receiving a call for file information (step 1200). This call may be received from an application, such as application 306 in FIG. 3. Next, a database is queried for file names and locations of files for the application identified in the query (step 1202). A result is received from the database (step 1204), and returned to the caller (step 1206) with the process terminating thereafter.

Figure 13:
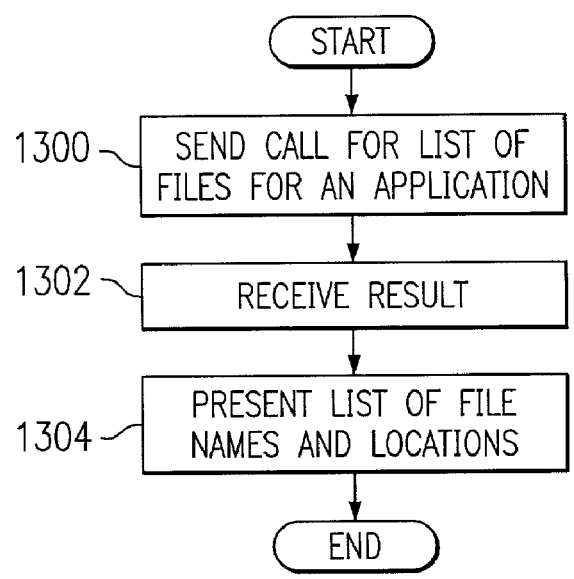
FIG. 13 is a flowchart of a process used by an application to obtain a list of files in accordance with a preferred embodiment of the present invention.

With reference now to FIG. 13, a flowchart of a process used by an application to obtain a list of files is depicted in accordance with a preferred embodiment of the present invention. The process illustrated in FIG. 13 may be implemented in an application, such as application 304 in FIG. 3.

The process begins by sending a call for a list of files for an application (step 1300). This application may be the application generating the call for the list or for another application. This call is sent to a device driver, such as device driver 308 in FIG. 3. Next, a result is received (step 1302). Then, a list of file names and locations is presented on a display to the user (step 1304) with the process terminating thereafter.

One use of the mechanism of the present invention is for migration of applications. When the user needs to migrate the application file data to another system, the user first installs the relevant applications on the new system. The user then invokes the invention and selects the "migrate" option. This option presents a menu of the files to migrate by reading the relational meta data for each file that is related to the relevant applications. The user can then accept or refuse for one or more files to be copied or migrated to the new system.

Thus, the present invention provides an improved method, apparatus, and computer implemented instructions for dynamically discovering relationships between applications and associated data. This mechanism provides an advantage in identifying files for a particular application at a later time. Files that are created, renamed, moved, copied, and deleted may be identified if needed. The mechanism employs identifying this data at the point at which calls are made for file functions. The meta data is stored in a data structure, such as a database, in these examples. Of course other types of data structure may be used depending on the particular implementation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for tracking relationships between programs and data, the method comprising:

receiving a file access request from a particular program, wherein the file access request is for a particular file and is received at an operating system level and wherein the particular file is determined by a specified file name;

creating an association between the specified file name and the particular program requesting the file access, in response to receiving the file access request;

responsive to creating the association, storing the association between the specified file name and the particular program, wherein the association is used for subsequent accesses to the file and is stored in relation to other stored associations, said other associations respectively corresponding to each of the other file names for which file access is requested by the particular program; and saving all of the stored associations for at least the life of the particular program.

2. The method of claim 1, wherein said method includes accessing a database containing each of said stored associations to find the file names and locations of all of the data and configuration files associated with the particular program.

3. The method of claim 1, wherein the association includes a program name for the program.

4. The method of claim 3, wherein the association further includes at least one of a location of the file, a time of file access, a date of file access, an extension for the file, and an identification of a user of the program.

5. The method of claim 4, wherein the location of the file is in a remote data processing system.

6. The method of claim 1, wherein the file request is one of a request to open the file, close the file, copy the file, or delete the file.

7. The method of claim 1, wherein the program is a first program and wherein a request to open the file originates from the first program and a request to close the file originates from a second program.

8. The method of claim 7, wherein the association includes the second program.

9. The method of claim 1, wherein the receiving step, the creating step, and the storing step are performed within an operating system kernel.

10. The method of claim 1, wherein the receiving step, the creating step, and the storing step are performed within a device driver.

11. The method of claim 10, wherein the drive driver intercepts calls directed to a mechanism used as a point of entry for the access.

12. The method of claim 1, wherein the storing step comprises:
storing the association between the file and the program in a database.

13. The method of claim 1, wherein associations are stored in a database and further comprising:
receiving a request from a requestor to access the associations;
querying the database for the associations;
receiving a result from the database; and
returning the result returned from the database to the requestor.

14. The method of claim 1, wherein the storing step comprises:
storing the association between the file and the program in at least one of a registry, file, and a file system.

15. A data processing system for tracking relationships between programs and data, the data processing system comprising:
receiving means for receiving a file access request from a particular program, wherein the file access request is for a particular file and is received at an operating system level and wherein the particular file is defined by a specified file name;
creating means for creating an association between the specified file name and the particular program requesting the file access, in response to receiving the file access request;
storing means responsive to creation of the association for storing the association between the specified file name and the particular program, wherein the association is used for subsequent accesses to the file and is stored in relation to other stored associations, said other associations respectively corresponding to other file names for which file access is requested by the particular program; and
means for saving all of the stored associations for at least the life of the particular program.

16. The data processing system of claim 15, wherein the association is stored as meta data.

17. The data processing system of claim 15, wherein the association includes a file name for the file and a program name for the program.

18. The data processing system of claim 17, wherein the association further includes at least one of a location of the file, a time of file access, a date of file access, an extension far the file, and an identification of a user of the program.

19. The data processing system of claim 18, wherein the location of the file is in a remote data processing system.

20. The data processing system of claim 15, wherein the file request is one of a request to open the file, close the file, copy the file, or delete the file.

21. The data processing system of claim 15, wherein the program is a first program and wherein a request to open the file originates from the first program and a request to close the file originates from a second program.

22. The data processing system of claim 15, wherein the association includes the second program.

23. The data processing system of claim 15, wherein the receiving means, the creating means, and the storing means are located within an operating system kernel.

24. The data processing system of claim 15, wherein the receiving means, the creating means, and the storing means are located within a device driver.

25. The data processing system of claim 24, wherein the drive driver intercepts calls directed to a mechanism used as a point of entry for the access.

26. The data processing system of claim 15, wherein the storing means comprises:
means for storing the association between the file and the program in a database.

27. The data processing system of claim 15, wherein associations are stored in a database, wherein the receiving means is a first receiving means, and further comprising:
second receiving means for receiving a request from a requestor to access the associations;
querying means for querying the database for the associations;
third receiving means for receiving a result from the database; and
returning means for returning the result returned from the database to the requestor.

28. The data processing system of claim 15, wherein the storing means comprises:
means for storing the association between the file and the program in at least one of a registry, file, and a file system.

29. A computer program product in a computer readable medium for tracking relationships between programs and data, the computer program product comprising:
first instructions for receiving a file access request from a particular program, wherein the file access request is for a particular file and is received at an operating system level and wherein the particular file is defined by a specified file name;
second instructions for creating an association between the specified file name and the particular program requesting the file accessing response to receiving the file access request;
third instructions, responsive to creating the association, for storing the association between the specified file name and the particular program, wherein the association is used for subsequent accesses to the file and is stored in relation to other stored associations, said other associations respectively corresponding to other file names for which file access is requested by the particular program; and
fourth instructions for saving all of the stored associations for at least the life of the particular program.

30. The computer program product of claim 29, wherein the association is stored as meta data.

31. The computer program product of claim 29, wherein the association includes a program name for the program.

32. The computer program product of claim 31, wherein the association further includes at least one of a location of the file, a time of file access, a date of file access, an extension for the file, and an identification of a user of the program.

33. The computer program product of claim 32, wherein the location of the file is in a remote data processing system.

34. The computer program product of claim 29, wherein the file request is one of a request to open the file, close the file, copy the file, or delete the file.

35. The computer program product of claim 29, wherein the program is a first program and wherein a request to open the file originates from the first program and a request to close the file originates from a second program.

36. The computer program product of claim 29, wherein the association includes the second program.

37. The computer program product of claim 29, wherein the first instructions, the second instructions, and the third instructions are located within an operating system kernel.

38. The computer program product of claim 29, wherein the first instructions, the second instructions, and the third instructions are located within a device driver.

39. The computer program product of claim 38, wherein the drive driver intercepts calls directed to a mechanism used as a point of entry for the access.

40. The computer program product of claim 29, wherein the third instructions comprises:
   sub-instructions for storing the association between the file and the program in a database.

41. The computer program product of claim 29, wherein associations are stored in a database and further comprising:
   fifth instructions for receiving a request from a requestor to access the associations;
   sixth instructions for querying the database for the associations;
   seventh instructions for receiving a result from the database; and
   eighth instructions for returning the result returned from the database to the requestor.

42. The computer program product of claim 29, wherein the third instructions comprises:
   sub-instructions for storing the association between the file and the program in at least one of a registry, file, and a file system.

* * * * *

UNITED STATES PATENT AND TRADEMARK OFFICE
CERTIFICATE OF CORRECTION

| | | |
|---|---|---|
| PATENT NO. | : 7,016,920 B2 | Page 1 of 1 |
| APPLICATION NO. | : 09/865243 | |
| DATED | : March 21, 2006 | |
| INVENTOR(S) | : Mastrianni et al. | |

It is certified that error appears in the above-identified patent and that said Letters Patent is hereby corrected as shown below:

Col. 12, line 37: after "file" delete "accessing" and insert --access, in--.

Signed and Sealed this

Twelfth Day of December, 2006

JON W. DUDAS
*Director of the United States Patent and Trademark Office*